(12) United States Patent
Chien et al.

(10) Patent No.: US 8,483,516 B2
(45) Date of Patent: Jul. 9, 2013

(54) SUPER RESOLUTION SYSTEM AND METHOD WITH DATABASE-FREE TEXTURE SYNTHESIS

(75) Inventors: Shao-Yi Chien, Taipei (TW); Yi-Nung Liu, Taipei (TW); Yi-Chun Lin, Taipei (TW); Ling-Hsiu Huang, Tainan (TW)

(73) Assignees: National Taiwan University, Taipei (TW); Himax Technologies Limited, Tainan (TW)

( * ) Notice: Subject to any disclaimer, the term of this patent is extended or adjusted under 35 U.S.C. 154(b) by 140 days.

(21) Appl. No.: 13/211,195

(22) Filed: Aug. 16, 2011

(65) Prior Publication Data

US 2013/0044965 A1 Feb. 21, 2013

(51) Int. Cl.
*G06K 9/32* (2006.01)
*G06K 9/40* (2006.01)
*H04N 7/01* (2006.01)
*H04N 11/20* (2006.01)

(52) U.S. Cl.
USPC ........... 382/299; 382/266; 382/300; 382/275; 348/451; 348/E7.003

(58) Field of Classification Search
USPC ............... 382/299; 348/451, E07.003
See application file for complete search history.

(56) References Cited

U.S. PATENT DOCUMENTS

| | | | | |
|---|---|---|---|---|
| 6,480,617 B2* | 11/2002 | Kovacs-Vajna | ............... | 382/125 |
| 7,375,767 B2* | 5/2008 | Lee et al. | ............... | 348/581 |
| 7,876,979 B2* | 1/2011 | Lee et al. | ............... | 382/300 |
| 8,233,734 B2* | 7/2012 | Zhang et al. | ............... | 382/254 |
| 2002/0159648 A1* | 10/2002 | Alderson et al. | ............... | 382/260 |
| 2003/0076883 A1* | 4/2003 | Bottreau et al. | ......... | 375/240.12 |
| 2003/0142761 A1* | 7/2003 | Chen | ............... | 375/326 |
| 2003/0152105 A1* | 8/2003 | Arimilli | ............... | 370/468 |
| 2005/0286794 A1* | 12/2005 | Brunner et al. | ............... | 382/264 |
| 2007/0053013 A1* | 3/2007 | Takahashi | ............... | 358/474 |
| 2007/0091997 A1* | 4/2007 | Fogg et al. | ............... | 375/240.1 |
| 2007/0229710 A1* | 10/2007 | Park et al. | ............... | 348/618 |
| 2008/0284880 A1* | 11/2008 | Numata | ............... | 348/241 |
| 2008/0285853 A1* | 11/2008 | Bressan | ............... | 382/169 |
| 2008/0291332 A1* | 11/2008 | Messing et al. | ............... | 348/625 |
| 2010/0074548 A1* | 3/2010 | Pan et al. | ............... | 382/260 |
| 2010/0074549 A1* | 3/2010 | Zhang et al. | ............... | 382/263 |
| 2010/0118977 A1* | 5/2010 | Chiu et al. | ............... | 375/240.25 |
| 2010/0119176 A1* | 5/2010 | Ichihashi et al. | ............... | 382/300 |
| 2011/0081094 A1* | 4/2011 | Damkat | ............... | 382/254 |
| 2012/0082396 A1* | 4/2012 | Crandall et al. | ............... | 382/266 |
| 2012/0086850 A1* | 4/2012 | Irani et al. | ............... | 348/441 |
| 2012/0314975 A1* | 12/2012 | Shin et al. | ............... | 382/299 |

OTHER PUBLICATIONS

A. Heinrich, G. de Haan, and C.N. Cordes, "A novel performance measure for picture rate conversion methods," in Digest of Technical Papers of International Conference on Consumer Electronics, Jan. 2008, pp. 1-2.*

* cited by examiner

*Primary Examiner* — Michelle Entezari
(74) *Attorney, Agent, or Firm* — Stout, Uxa, Buyan & Mullins, LLP

(57) ABSTRACT

A super resolution (SR) method or system with database-free texture synthesis is disclosed. An input image is up-sampled to result in an up-sampled image. It is determined whether the input image possesses a smooth region. Edges of the up-sampled image are enhanced, and the enhancing edges step is bypassed if the smooth region has been detected. The enhanced or unenhanced up-sampled image is texture synthesized by taking the input image as texture example, thereby resulting in a synthesized image.

22 Claims, 3 Drawing Sheets

SUPER RESOLUTION SYSTEM AND METHOD WITH DATABASE-FREE TEXTURE SYNTHESIS

BACKGROUND OF THE INVENTION

1. Field of the Invention

The present invention generally relates to digital image processing, and more particularly to a super resolution (SR) system and method with database-free texture synthesis.

2. Description of Related Art

Super resolution (SR) is a technique that increases the resolution of an imaging system with a goal to recover a high-resolution image with sharp edges and rich details from a low-resolution input image. Due to the increasing gap between the resolution of image sources and display devices, super resolution has become an essential technique in many applications, such as TV scaler and digital holography.

There are two main categories in the conventional super resolution: edge-based approach and learning-based approach. The former one can generate extremely sharp edges but lack of details in the non-edge part; the latter one can give results with rich details but requires database and has difficulty controlling artifacts due to mismatch between the database and the input images. Moreover, there are some problems in the database generation. Large database implies large computation time, while small database may fail to provide suitable details for various inputs.

For the foregoing reasons, a need has arisen to propose a novel super resolution scheme for producing more rich, details and sharp edges without database.

SUMMARY OF THE INVENTION

In view of the foregoing, it is an object of the embodiment of the present invention to provide a super resolution (SR) system and method with database-free texture synthesis taking the input image as texture example in low-complexity but fast and high-quality manner.

According to one embodiment, a super resolution (SR) system with database-free texture synthesis includes an up-sampling unit, an edge enhancement unit, a smooth region detection unit and a texture synthesis unit. The up-sampling unit is configured to up-sample an input, image, thereby resulting in an up-sampled image. The edge enhancement unit is configured to enhance edges of the up-sampled image. The smooth region detection unit is configured to determine whether the input image possesses a smooth region, wherein the edge enhancement unit is bypassed if the smooth region has been detected. The texture synthesis unit is configured to take the input image as texture example to perform texture synthesis on the enhanced up-sampled image from the edge enhancement unit or on the unenhanced up-sampled image from the up-sampling unit, thereby resulting in a synthesized image.

DETAILED DESCRIPTION OF THE INVENTION

Figure 1:
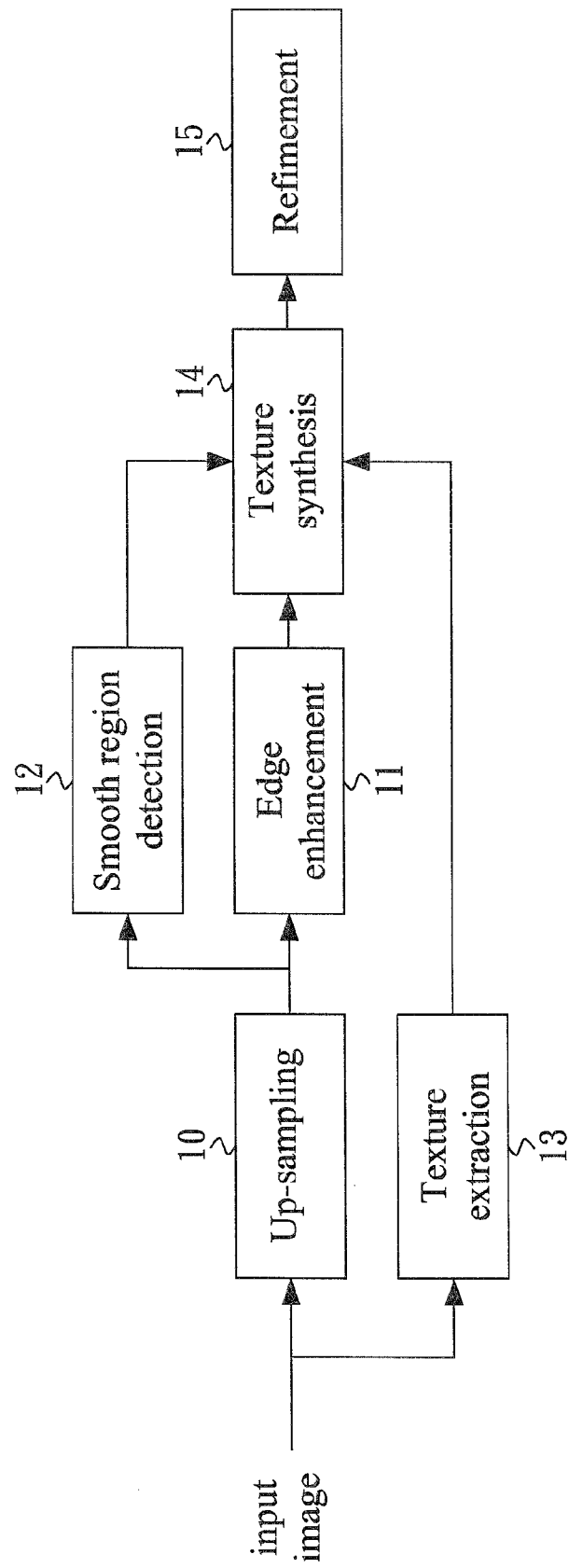
FIG. 1 shows a block diagram illustrative of a super resolution (SR) system with database-free texture synthesis according to one embodiment of the present invention.
Figure 2:
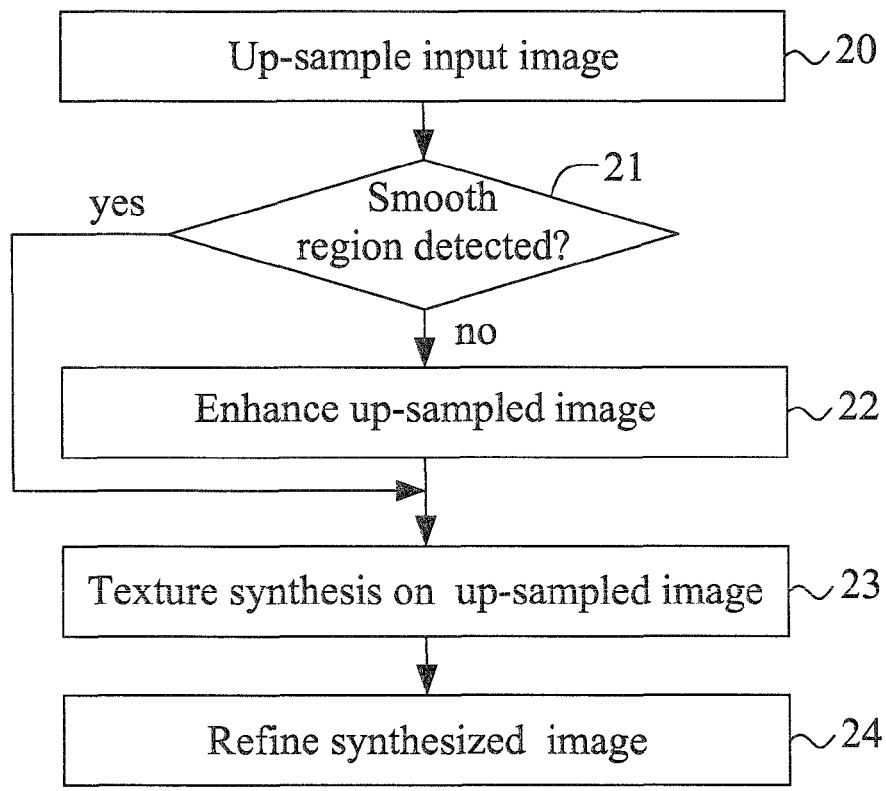
FIG. 2 shows a flow diagram illustrative of a super resolution (SR) method with database-free texture synthesis according to one embodiment of the present invention.

FIG. 1 shows a block diagram illustrative of a super resolution (SR) system with database-free texture synthesis according to one embodiment of the present invention. FIG. 2 shows a flow diagram illustrative of a super resolution (SR) method with database-free texture synthesis according to one embodiment of the present invention. According to the disclosed super resolution system or method a super-resolution output image may be estimated through learning high-frequency details from a low-resolution input image itself based on self-similarity property. As a result, no extra database is required, and no users' guidance or threshold setting is needed. Compared to the conventional super resolution system and method, the disclosed, super resolution system and method provide low-complexity but high-quality super-resolution, scheme, which performs quicker and produces more rich details and sharp edges, and is more suitable for hardware implementation and is better adaptable in real applications, such as TV scaler.

Specifically speaking, referring to FIG. 1 and FIG. 2, an input image of low resolution is first up-sampled (step 20) by an up-sampling unit 10, therefore resulting in an up-sampled image. The up-sampling factor or magnification factor may be an integer (e.g., 2) or a fraction. The up-sampling unit 10 may preferably, but not necessarily, adopt double interpolation framework, details of which may refer to "Direction-adaptive image upsampling using double interpolation," in Proc. Picture Coding Symposium, 2010, by Lin et al., the disclosure of which is hereby incorporated herein by reference. It is noted that the double interpolation framework may substantially reduce most of zigzag artifacts and give better results than, for example, bicubic interpolation.

Next, the up-sampled image is selectively subjected to a sharpening or enhancing process using deblur technique (step 22) by an edge enhancement unit 11, thus resulting in an enhanced image. The edges of the up-sampled image may accordingly be enhanced. In one exemplary embodiment, the sharpening process is performed by increasing (for example, doubling) the high-frequency part of the up-sampled image such that the edges may thus be enhanced.

According to FIG. 1 and FIG. 2, the edge enhancement unit 11 and step 22 may on certain, occasions be bypassed according the determination result of a smooth region detection unit 12, which determines whether the input image possesses a smooth region (step 21). If the smooth region has been detected, step 22 (FIG. 2) or block 11 (FIG. 1) is bypassed, followed by proceeding to step 23 or block 14. If the smooth region, has not been detected, step 22 or block 11 is performed, followed by proceeding to step 23 or block 14. In one exemplary embodiment, the smooth region is detected as follows. The pixel of the input image is marked as smooth region if difference between the input image and bicubic-interpolated image (that is interpolated from the input image) is smaller than a predetermined first threshold. When the number of the marked pixels is greater than a predetermined second threshold, the input image is therefore determined to possess a smooth region.

Subsequently, the enhanced image (if step 22 or block 11 has been performed) or the up-sampled image (if step 22 or block 11 has been bypassed) is subjected to texture synthesis talking the input image as texture example (step 23) by a texture synthesis unit 14, thereby resulting in a synthesized image or an output image of the super resolution (SR) system. The rationale of taking the input image as texture example in the embodiment is that the fractal property in nature images illustrates the phenomenon of self-similarity among different scales. In nature images, it has been discovered that similar patches tend to repeatedly appear in different scales.

Figure 3:
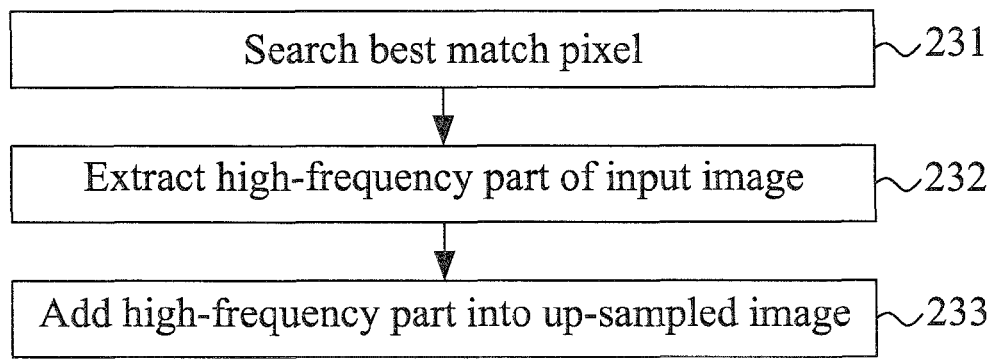
FIG. 3 shows a detailed flow diagram of step 23 of FIG. 2.
Figure 4:
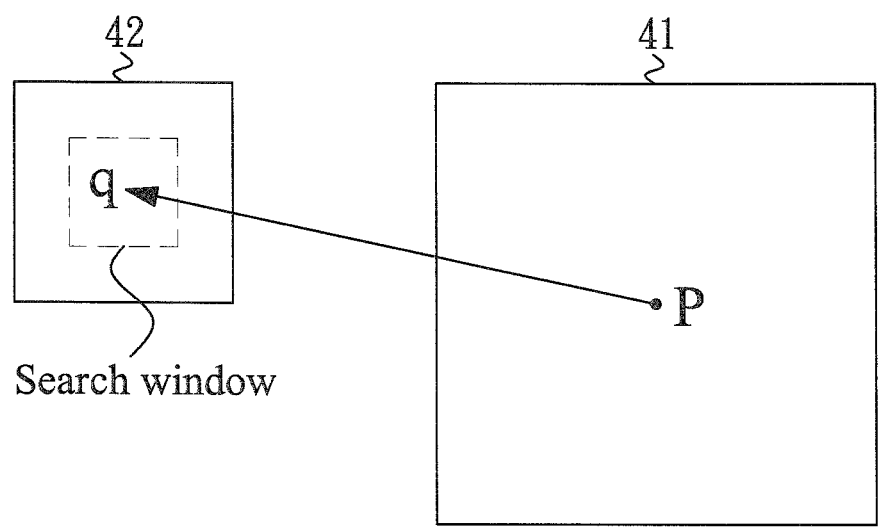
FIG. 4 schematically illustrates searching a best match (BM) pixel q in the input image for each pixel p in the up-sampled image.

FIG. 3 shows a detailed flow diagram of step 23 of FIG. 2. In step 231, as schematically shown in FIG. 4, for each pixel p in the (enhanced or unenhanced) up-sampled image 41, a best match (BM) pixel q is searched in a corresponding area (or a search window) $N_p$ of the input image 42 and may be expressed as follows:

$$BM_p = \underset{q}{\operatorname{argmin}} \sum_{m \in \Omega_p} \sum_{n \in \Omega_q} |I_n^l - I_m^h|^2, q \in N_p$$

where $I^l$ is the input image with low resolution, $I^h$ is the up-sampled image with high resolution, and $\Omega_p$, and $\Omega_q$ are correlation regions of p and q respectively. The search window $N_p$ generally has a small size (that is, a size that is substantially smaller than the entire size of the input image), and the matching time may thus be largely reduced compared to the conventional method.

Next, in step 232, the high-frequency part $H(I^l)$ of the input image is extracted by a texture extraction unit 13. In the embodiment, the low-frequency part $B(I^l)$ of the input image is firstly obtained, for example, by a bilateral filter B, an edge-preserving and noise reducing smoothing filter. Afterwards, the low-frequency part $B(I^l)$ is subtracted from the input image, thereby obtaining the high-frequency part $H(I^l)$ of the input image, which may be expressed as follows:

$$H(I^l) = (I^l) - B(I^l)$$

where B( ) is a bilateral filter, and H( ) is the high-frequency part.

Finally, in step 233, the extracted high-frequency part $H(I^l)$ of the input image is added into the (enhanced or unenhanced) up-sampled image as follows:

$$I_p^h = I_p^h + H(I_{BM_p}^l)$$

where $I_p^h$ is the pixel p of the up-sampled image, and $I_{BM_p}^l$ is the best match pixel in the input image.

The synthesized image may further optionally be refined (step 24) by a refinement unit 15, thereby resulting in a refined image. The refinement is utilized in the embodiment to restrict the output image (i.e., the synthesized image) to be faithful to the input image. In the embodiment, a reconstruction constraint is applied to the synthesized image with an energy function:

$$E(I^h|I^l) = |D(I^h * G) - I^l|^2$$

where G is a Gaussian kernel and D is a down-sample process.

The reconstruction constraint may force the down sample version of the output image (i.e., the refined image) to be similar with the input image. This may prevent flickering artifact when applying to video. The energy function is minimized, in the embodiment, via gradient descent:

$$I_{t+1}^h = I_t^h - \tau \nabla E(I_t^h)$$

where t is an iteration index, and τ is a step size.

Although specific embodiments have been illustrated and described, it will be appreciated by those skilled in the art that various modifications may be made without departing from the scope of the present invention, which is intended to be limited solely by the appended claims.

What is claimed is:

1. A super resolution (SR) system with database-free texture synthesis using a processor, the system comprising:

an up-sampling unit configured to up-sample an input image, thereby resulting in an up-sampled image;

an edge enhancement unit configured to enhance edges of the up-sampled image;

a smooth region detection unit configured to determine whether the input image possesses a smooth region, wherein the edge enhancement unit is bypassed if the smooth region has been detected;

a texture synthesis unit configured to take the input image as texture example to perform texture synthesis on the enhanced up-sampled image from the edge enhancement unit or on the unenhanced up-sampled image from the up-sampling unit, thereby resulting in a synthesized image; and a refinement unit configured to refine the synthesized image to restrict the synthesized image to be faithful to the input image;

wherein the refinement unit applies reconstruction constraint to the synthesized image with an energy function:

$$E(I^h|I^l) = |D(I^h * G) - I^l|^2$$

where $I^l$ is the input image, $I^h$ is the up-sampled image, G is a Gaussian kernel and D is a down-sample process.

2. The system of claim 1, wherein the up-sampling unit performs double interpolation on the input image.

3. The system of claim 1, wherein the edge enhancement unit performs edge enhancement on the up-sampled image by increasing high-frequency part of the up-sampled image.

4. The system of claim 1, wherein the smooth region detection unit performs detection on the input image according to the following steps:

marking a pixel of the input image as the smooth region if a difference between the input image and an image interpolated from the input image is smaller than a predetermined first threshold; and determining that the input image possesses the smooth region when a number of the marked pixels is greater than a predetermined second threshold.

5. The system of claim 1, wherein the texture synthesis unit searches a best match pixel in a search window of the input image for each pixel in the enhanced or unenhanced up-sampled image.

6. The system of claim 5, wherein the best match pixel q in the input image $I^l$ for the pixel p in the enhanced or unenhanced up-sampled image $I^h$ is expressed as follows:

$$BM_p = \underset{q}{\operatorname{argmin}} \sum_{m \in \Omega_p} \sum_{n \in \Omega_q} |I_n^l - I_m^h|^2, q \in N_p$$

where $\Omega_p$ and $\Omega_q$ are correlation regions of p and q respectively.

7. The system of claim 5, wherein the search window is substantially smaller than an entire size of the input image.

8. The system of claim 5, further comprising a texture extraction unit configured to extract high-frequency part of the input image.

9. The system of claim 8, wherein the texture extraction unit extracts the high-frequency part according to the following steps:
  obtaining low-frequency part of the input image; and
  subtracting the low-frequency part from the input image, thereby obtaining the high-frequency part of the input image.

10. The system of claim 8, wherein the texture synthesis unit adds the extracted high-frequency part into the enhanced or unenhanced up-sampled image, thereby resulting in the synthesized image.

11. The system of claim 1, wherein the refinement unit minimizes the energy function via gradient descent:

$$I_{t+1}^h = I_t^h \tau \nabla E(I_t^h)$$

where t is an iteration index, and $\tau$ is a step size.

12. A super resolution (SR) method with database-free texture synthesis, comprising a processor for performing the following steps:
  up-sampling an input image to result in an up-sampled image;
  determining whether the input image possesses a smooth region;
  enhancing edges of the up-sampled image, wherein the enhancing edges step is bypassed if the smooth region has been detected;
  texture synthesizing the enhanced or unenhanced up-sampled image by taking the input image as texture example, thereby resulting in a synthesized image; and
  refining the synthesized image to restrict the synthesized image to be faithful to the input image;
  wherein the step of refining the synthesized image comprises applying reconstruction constraint to the synthesized image with an energy function:

$$E(I^h|I^l) = |D(I^h*G) - I^l|^2$$

where $I^l$ is the input image, $I^h$ is the up-sampled image, G is a Gaussian kernel and D is a down-sample process.

13. The method of claim 12, wherein the up-sampling step performs double interpolation on the input image.

14. The method of claim 12, wherein the enhancing edges step comprises:
  increasing high-frequency part of the up-sampled image.

15. The method of claim 12, wherein the determining step comprises:
  marking a pixel of the input image as the smooth region if a difference between the input image and an image interpolated from the input image is smaller than a predetermined first threshold; and
  determining that the input image possesses the smooth region when a number of the marked pixels is greater than a predetermined second threshold.

16. The method of claim 12, wherein the texture synthesizing step comprises:
  searching a best match pixel in a search window of the input image for each pixel in the enhanced or unenhanced up-sampled image.

17. The method of claim 16, wherein the best match pixel q in the input image $I^l$ for the pixel p in the enhanced or unenhanced up-sampled image $I^h$ is expressed as follows:

$$BM_p = \underset{q}{\operatorname{argmin}} \sum_{m \in \Omega_p} \sum_{n \in \Omega_q} |I_n^l - I_m^h|^2, q \in N_p$$

where $\Omega_p$ and $\Omega_q$ are correlation regions of p and q respectively.

18. The method of claim 16, wherein the search window is substantially smaller than an entire size of the input image.

19. The method of claim 16, wherein the texture synthesizing step further comprises a step of extracting high-frequency part of the input image.

20. The method of claim 19, wherein the high-frequency part is extracted according to the following steps:
  obtaining low-frequency part of the input image; and
  subtracting the low-frequency part from the input image, thereby obtaining the high-frequency part of the input image.

21. The method of claim 19, wherein the texture synthesizing step further comprises a step of adding the extracted high-frequency part into the enhanced or unenhanced up-sampled image, thereby resulting in the synthesized image.

22. The method of claim 12, wherein the energy function is minimized via gradient descent:

$$I_{t+1}^h = I_t^h - \tau \nabla E(I_t^h)$$

where t is an iteration index, and $\tau$ is a step size.

* * * * *